US010419431B2

(12) United States Patent
Long

(10) Patent No.: US 10,419,431 B2
(45) Date of Patent: Sep. 17, 2019

(54) PREVENTING CROSS-SITE REQUEST FORGERY USING ENVIRONMENT FINGERPRINTS OF A CLIENT DEVICE

(71) Applicant: Alibaba Group Holding Limited, Grand Cayman (KY)

(72) Inventor: Bin Long, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 220 days.

(21) Appl. No.: 15/271,951

(22) Filed: Sep. 21, 2016

(65) Prior Publication Data

US 2017/0085567 A1 Mar. 23, 2017

(30) Foreign Application Priority Data

Sep. 23, 2015 (CN) .......................... 2015 1 0612430

(51) Int. Cl.
*H04L 29/08* (2006.01)
*H04L 29/06* (2006.01)
(52) U.S. Cl.
CPC ...... *H04L 63/0876* (2013.01); *H04L 63/1483* (2013.01); *H04L 67/02* (2013.01); *H04L 67/2809* (2013.01); *H04L 67/42* (2013.01)
(58) Field of Classification Search
CPC .................................................. H04L 63/0876
USPC ............................................................. 726/6
See application file for complete search history.

(56) References Cited

U.S. PATENT DOCUMENTS

| 7,278,025 B2 * | 10/2007 | Saito ...................... G06K 19/07 |
| | | 713/185 |
| 8,020,193 B2 | 9/2011 | Bhola et al. |
| 8,332,946 B1 * | 12/2012 | Boisjolie ............... H04L 63/145 |
| | | 726/24 |
| 8,370,315 B1 * | 2/2013 | Efstathopoulos ... G06F 17/3015 |
| | | 707/696 |
| 8,438,649 B2 | 5/2013 | Ichnowski |
| 8,495,135 B2 | 7/2013 | Amit et al. |
| 8,495,137 B2 | 7/2013 | Amit et al. |
| 8,505,106 B1 | 8/2013 | Bhosle et al. |

(Continued)

OTHER PUBLICATIONS

International Search Report and Written Opinion to corresponding International Application No. PCT/US2016/052978 dated Dec. 15, 2016.

*Primary Examiner* — Haresh N Patel
(74) *Attorney, Agent, or Firm* — James J. DeCarlo; Greenberg Traurig, LLP

(57) ABSTRACT

Disclosed is a method and apparatus for preventing cross-site request forgery. The recommendation method comprises storing a first environment fingerprint associated with a client, wherein the first environment fingerprint uniquely identifies the client based on local terminal information associated with the client; receiving an access request message from the client, the access request message including at least one operation and a second environment fingerprint generated by the client; determining whether the second environment fingerprint matches the first environmental fingerprint; rejecting the access request message if it is determined that the second environment fingerprint does not match the first environment fingerprint; and executing the operation included with the access request message if it is determined that the second environment fingerprint matches the first environment fingerprint.

17 Claims, 11 Drawing Sheets

(56) References Cited

U.S. PATENT DOCUMENTS

| | | |
|---|---|---|
| 8,813,237 B2 | 8/2014 | Amit et al. |
| 8,839,424 B2 | 9/2014 | Hansen |
| 8,893,270 B1 | 11/2014 | Yang et al. |
| 8,918,866 B2 | 12/2014 | Luo et al. |
| 8,959,650 B1 * | 2/2015 | Richards .................. G06F 21/44 709/227 |
| 8,997,222 B2 | 3/2015 | Meliksetian et al. |
| 9,015,820 B1 | 4/2015 | Bhosle et al. |
| 9,021,586 B2 | 4/2015 | Garskof |
| 9,104,838 B2 | 8/2015 | Gajda et al. |
| 9,118,619 B2 | 8/2015 | Gantman et al. |
| 9,154,570 B2 | 10/2015 | Meliksetian et al. |
| 9,191,405 B2 | 11/2015 | Gallagher et al. |
| 9,742,757 B2 * | 8/2017 | Canning ............. H04L 63/0807 717/118 |
| 2006/0259896 A1 * | 11/2006 | Hanson ..................... G06F 8/20 717/118 |
| 2006/0259897 A1 * | 11/2006 | Zorn ........................ G06F 8/20 717/118 |
| 2007/0006120 A1 * | 1/2007 | Proebsting ................ G06F 8/20 717/101 |
| 2007/0234054 A1 * | 10/2007 | Robert ................ H04L 63/0823 713/170 |
| 2007/0234409 A1 | 10/2007 | Eisen |
| 2008/0222736 A1 | 11/2008 | Boodaei et al. |
| 2010/0325710 A1 * | 12/2010 | Etchegoyen ............. G06F 21/31 726/7 |
| 2010/0333213 A1 * | 12/2010 | Etchegoyen .......... G06F 21/105 726/29 |
| 2011/0161855 A1 * | 6/2011 | Prehofer ........... H04M 1/72572 715/771 |
| 2011/0162072 A1 | 6/2011 | Hay et al. |
| 2012/0204033 A1 * | 8/2012 | Etchegoyen ............. G06F 21/33 713/175 |
| 2013/0055357 A1 * | 2/2013 | Etchegoyen ............. G06F 21/34 726/4 |
| 2013/0160132 A1 | 6/2013 | Genova et al. |
| 2013/0167203 A1 * | 6/2013 | Etchegoyen ........ H04L 63/0861 726/4 |
| 2014/0137189 A1 | 5/2014 | Hansen |
| 2015/0150110 A1 * | 5/2015 | Canning ............. H04L 63/0807 726/9 |
| 2016/0012272 A1 * | 1/2016 | Wong ...................... G06F 21/32 382/124 |
| 2016/0028730 A1 * | 1/2016 | Natarajan ............... G06F 21/31 726/6 |
| 2016/0191522 A1 * | 6/2016 | Liang ....................... H04L 9/32 713/168 |

* cited by examiner

PREVENTING CROSS-SITE REQUEST FORGERY USING ENVIRONMENT FINGERPRINTS OF A CLIENT DEVICE

CROSS-REFERENCE TO RELATED APPLICATIONS

This application claims the benefit of priority from Chinese Patent Application No. 201510612430.3, filed on Sep. 23, 2015, entitled "Method, Apparatus and System for Preventing Cross-Site Request Forgery," which is incorporated herein by reference in its entirety.

BACKGROUND

Field of the Disclosure

The disclosure relates to the field of computer technology, and in particular to a method, apparatus and system for preventing cross-site request forgery.

Description of the Related Art

Cross-site request forgery (CSRF) is a type of network attack where a forged request is sent to the server of a target site using the identity of a user without their knowledge and then, without their authorization, operations are executed using the user's permissions. For example, while a user is logged into a target site, a request to change a username may be sent to the server of the target site with an identifier and/or login information found in one of the user's cookies, thereby allowing the username to be altered without the user's knowledge.

BRIEF SUMMARY

To solve at least the above technical problem, the described embodiments of the disclosure provide a method, an apparatus and a system for preventing cross-site request forgery.

One embodiment of the disclosure relates to a method for preventing cross-site request forgery. In this embodiment, the method stores a first environment fingerprint associated with a client, wherein the first environment fingerprint uniquely identifies the client based on local terminal information associated with the client; receives an access request message from the client, the access request message including at least one operation and a second environment fingerprint generated by the client; determines whether the second environment fingerprint matches the first environmental fingerprint; rejects the access request message if it is determined that the second environment fingerprint does not match the first environment fingerprint; and executes the operation included with the access request message if it is determined that the second environment fingerprint matches the first environment fingerprint.

One embodiment of the disclosure relates to an apparatus for preventing cross-site request forgery. In this embodiment, the apparatus includes a processor and a non-transitory memory storing computer-executable instructions. The instructions cause the apparatus to store a first environment fingerprint associated with a client, wherein the first environment fingerprint uniquely identifies the client based on local terminal information associated with the client; receiving, at the server, an access request message from the client, the access request message including at least one operation and a second environment fingerprint generated by the client; determine whether the second environment fingerprint matches the first environmental fingerprint; reject the access request message if it is determined that the second environment fingerprint does not match the first environment fingerprint; and execute the operation included with the access request message if it is determined that the second environment fingerprint matches the first environment fingerprint.

One embodiment of the disclosure relates to a non-transitory computer readable storage medium tangibly storing computer program instructions capable of being executed by a computer processor. The computer program instructions define the steps of storing a first environment fingerprint associated with a client, wherein the first environment fingerprint uniquely identifies the client based on local terminal information associated with the client; receiving an access request message from the client, the access request message including at least one operation and a second environment fingerprint generated by the client; determining whether the second environment fingerprint matches the first environmental fingerprint; rejecting the access request message if it is determined that the second environment fingerprint does not match the first environment fingerprint; and executing the operation included with the access request message if it is determined that the second environment fingerprint matches the first environment fingerprint.

The above embodiments of the disclosure illustrate that when the client accesses the server for the first time, the server or client generates a unique environment fingerprint according to the local terminal information of the client and the server stores the environment fingerprint as the preset authentication information and may optionally send the environment fingerprint back to the client. During data interaction between the client and the server, the access request message of the client contains the environment fingerprint, so that the server can determine the validity of the above access request message by determining whether the received access request message contains the environment fingerprint matching the stored preset authentication information (e.g., the stored environment fingerprint).

In this way, an unauthorized terminal cannot obtain the correct environment fingerprint due to the fact that different terminals possess different terminal information (e.g., IP address, MAC address) and thus cannot pass server authentication due to differing environments and environment fingerprints. Therefore, the server can reject the operation requested by the access request message of the unauthorized terminal and thus effectively prevent CSRF attacks. In contrast to the prior art, the disclosed embodiments utilize terminal information to generate an environment fingerprint versus a page or session identifier. Further, unlike the prior art, the disclosed embodiments' use of terminal information allows an environment fingerprint to be generated either at the client or at the server. Thus, according to the embodiments disclosed herein, CSRF attacks can be effectively prevented, Internet security for users can be ensured, and security and privacy requirements can be met.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views.

DETAILED DESCRIPTION

The embodiments of the disclosure provide a method, device and system for preventing CSRF. For better understanding of the technical solutions of the disclosure by those skilled in the art, the technical solutions of the embodiments of the disclosure will be described clearly and completely in combination with the drawings herein. It is clear that the described embodiments are only some, not all, of the possible embodiments of the disclosure. Any other embodiments obtained by those skilled in the art based on the embodiments of the disclosure are intended to fall within the protection scope of the disclosure. The detailed implementations of the embodiments of the disclosure are described with the following specific examples. Although the methods described below contain multiple operations in a certain sequence, it should be understood that these methods may contain more or less operations that can be executed in sequence or concurrently (e.g., using parallel processors or in a multi-threaded environment).

Figure 1:
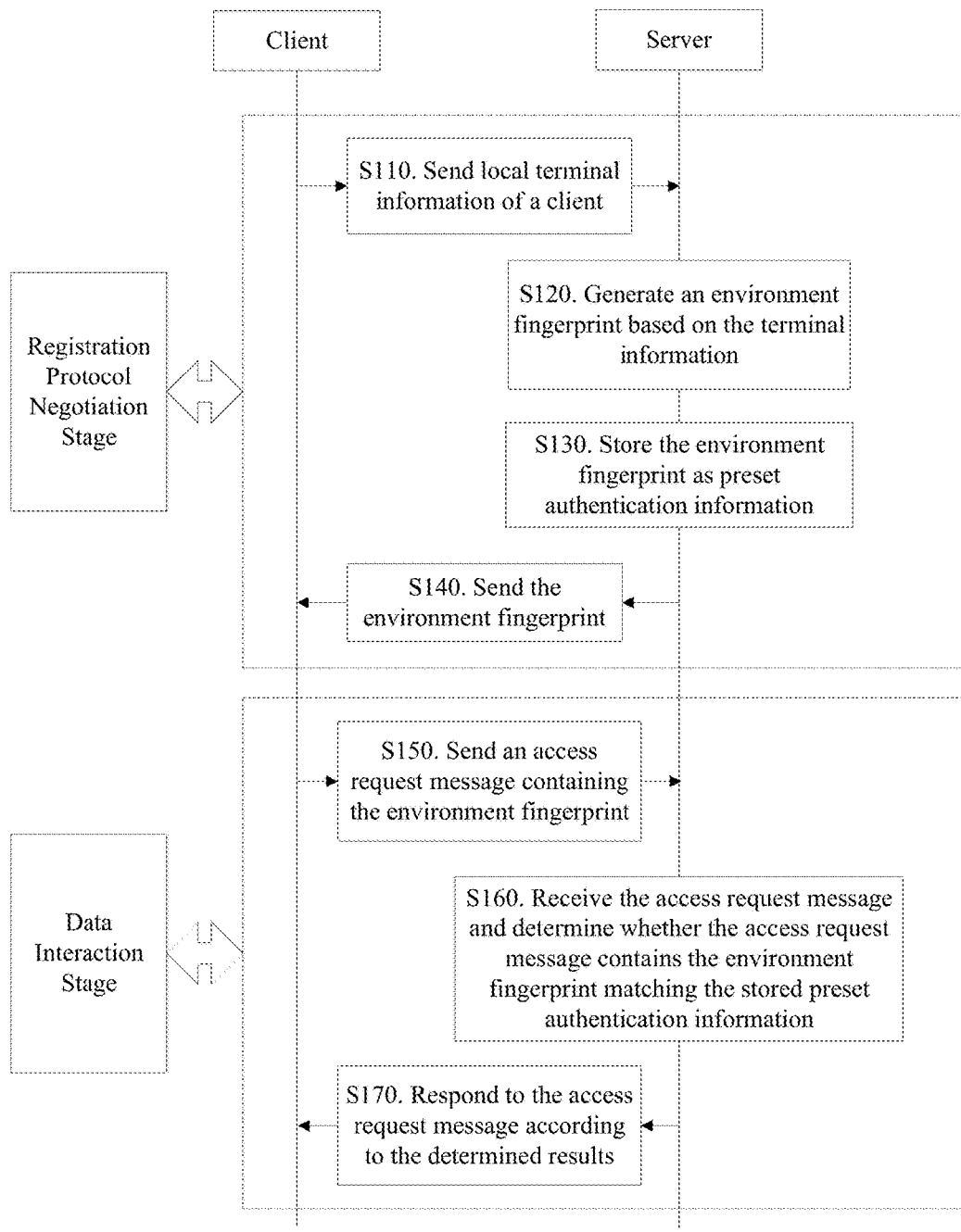
FIG. 1 is a flow diagram of a method for preventing CSRF according to some embodiments of the disclosure.

FIG. 1 is a flow diagram of a method for preventing CSRF, according to some embodiments of the disclosure.

In step S110, the method sends local terminal information from a client to the server. In some embodiments, the method sends the local terminal information from the client to the server when accessing the server for the first time (e.g., upon an initial visit to a webpage provided by the server).

In one embodiment, the local terminal information may comprise a unique identifier for identifying the terminal. Particularly, in some embodiments, the local terminal information may contain at least one of the following: a unique hardware identifier, a unique network identifier, a unique application identifier, or a combination thereof. In some embodiments, the unique hardware identifier may include, for example, the MAC address of the terminal, a unique serial number identifier of the terminal, or a combination thereof. In some embodiments, the unique network identifier of the terminal may include, for example, the IP address of the client, an identifier of the mobile communication network used by the client, or a combination thereof. In some embodiments, the unique application identifier of the terminal may, for example, include the user agent of the client browser. The local terminal information illustrated above is not intended to be limited to the above identifiers. In other embodiments, the content of the local terminal information may be determined according to application needs, and the embodiments of the disclosure are not restricted to any particular identifier format.

In step S120, the method, at the server, generates an environment fingerprint based on the local terminal information. In some embodiments, the environment fingerprint includes at least one of a unique hardware identifier, a unique network identifier, and a unique application identifier of the terminal in the local terminal information. In some embodiments, the environment fingerprint includes data generated by encrypting one or more of a unique hardware identifier, a unique network identifier, and a unique application identifier of the terminal.

In some embodiments, one or more unique hardware identifiers, unique network identifiers, and unique application identifiers of the terminal may be encrypted through algorithms such as MD5, RSA, or DSA. In some embodiments, the environment fingerprint may be a character string, such as: "f6c534209e0cc087b03696f303549ca0."

The method for generating the environment fingerprint is not limited to the above. In practical applications, the environment fingerprint may be generated according to actual application scenarios, and the embodiments of the disclosure are not restricted to a particular method of generating the environment fingerprint.

In step S130, the method stores the environment fingerprint as preset authentication information at the server and, in step S140, sends the environment fingerprint to the client from the server.

As illustrated in FIG. 1, steps S110 through S140 complete a registration protocol negotiation stage between the client and the server. In the illustrated embodiment, the registration protocol negotiation stage between the client and the server may include the process of accessing a website through a browser by a user and executing the method illustrated in steps S110 through S140 of FIG. 1 when accessing the server for the first time.

It should be noted that, the environment fingerprint negotiated between the server and the client in steps S110 through S140 is generated according to the local terminal information of the client. Moreover, the local terminal information among different terminals is different and different terminals cannot generate identical environment fingerprints by using rogue programs or scripts. Thus, the server can authenticate the validity of requests during the subsequent interactions with services based on the environment fingerprint generated in steps S110 through S140.

In step S150, the method sends an access request message containing the environment fingerprint from the client to the server. The client may send an access request message to the server when requesting access to data services (e.g., HTTP services) between the client and the server. In some embodiments, the data transmitted between the client and server (e.g., HTTP requests and responses) may, itself, contain the environment fingerprint. In some embodiments, the client may generate the access request message containing the environment fingerprint.

In step S160, the method receives the access request message at the server and determines whether the access request message contains an environment fingerprint matching stored preset authentication information. In some embodiments, the server can determine the validity of the received access request message by determining whether the access request message contains an environment fingerprint matching the stored preset authentication information.

In step S170, the method, at the server, responds to the access request message according to the results of the determination made in step S160.

In some embodiments, the server can determine the validity of the access request message and execute operations such as adding, deleting, searching, and altering, etc., included in the access request message when it is determined that the access request message contains an environment fingerprint matching the preset authentication information.

In some embodiments, the server can reject the access request message and not execute an operation included in the access request message when the access request message does not contain an environment fingerprint matching the preset authentication information. In some embodiments, the server can send a warning message to the client if the access request message does not contain an environment fingerprint matching the preset authentication information.

The access request message in step S150 may be sent by an automatically operated rogue program or a script on some terminal page when a CSRF occurs. In a case where the access request message is sent by an automatically operated rogue program or a script, as the information of different terminals is different, the access request message sent by the automatically operated rogue program or script will not contain the correct environment fingerprint, and the access request will be rejected by the server.

In one embodiment, the server can attach the environment fingerprint to a cookie sent to the browser as an identifier so that the browser can extract the identifier from the cookie and send it with a request parameter to the server when the web page requests the corresponding service. The server can determine the validity of the request according to the environment fingerprint in the request parameter.

According to the embodiment illustrated in FIG. 1, another terminal cannot obtain the correct environment fingerprint due to the fact that different terminals possess different terminal information and thus cannot pass server authentication. Therefore, the server can reject an operation included in the access request message sent by an incorrect terminal and thus effectively prevent CSRF. Compared with the prior art, CSRF attacks can be effectively prevented, Internet security for users can be ensured, and security requirements can be met.

Figure 2:
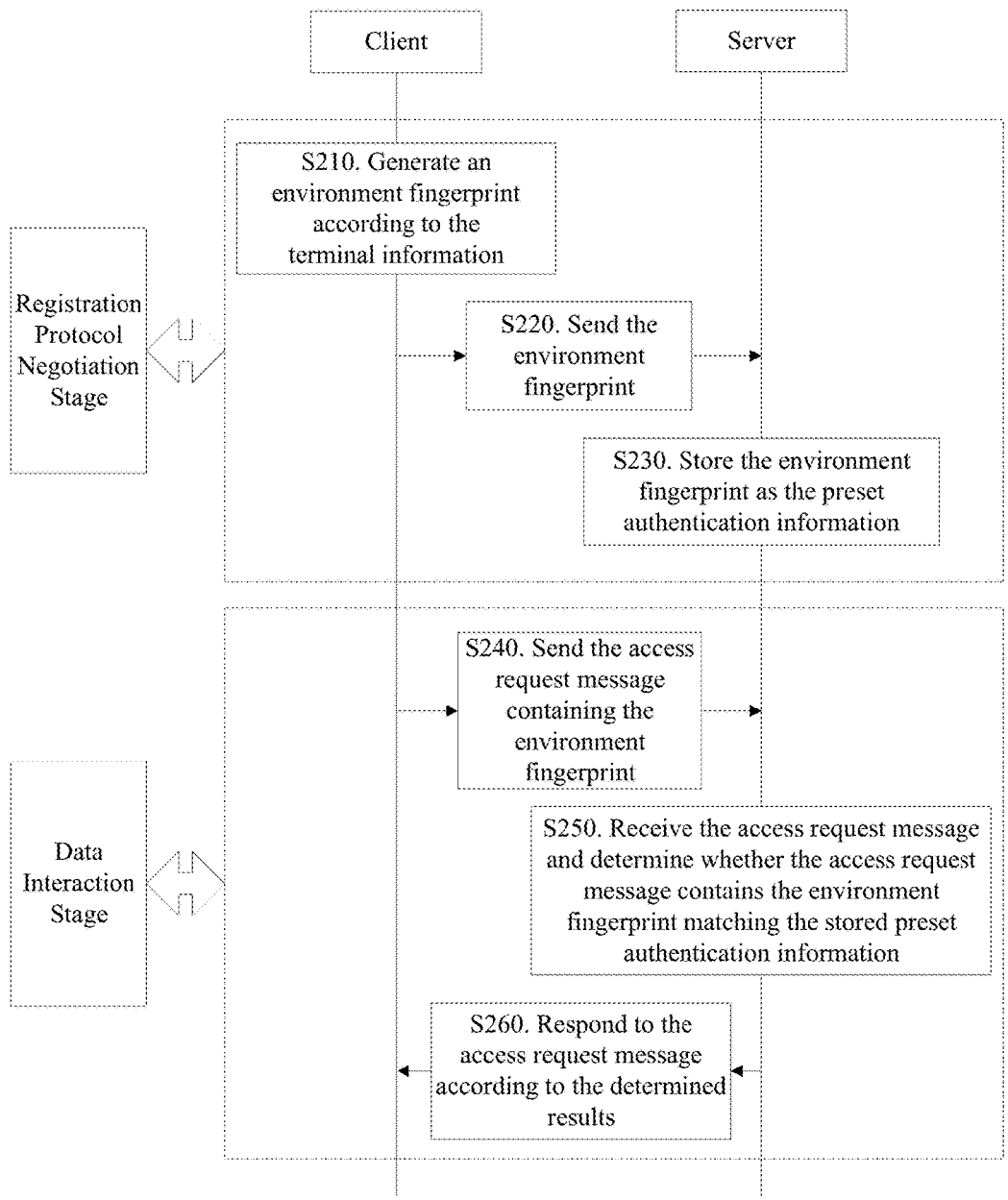
FIG. 2 is a flow diagram of a method for preventing CSRF according to some embodiments of the disclosure.

FIG. 2 is a flow diagram of a method for preventing CSRF, according to some embodiments of the disclosure.

In step S210, the client generates an environment fingerprint according to the local terminal information when accessing the server for the first time.

In some embodiments, the client can generate an environment fingerprint according to the local terminal information when accessing the server for the first time. In one embodiment, the local terminal information may comprise a unique identifier for identifying the terminal. Particularly, in some embodiments, the local terminal information may contain at least one of the following: a unique hardware identifier, a unique network identifier, and a unique application identifier, or a combination thereof. In some embodiments, the unique hardware identifier of the terminal may include, for example, the MAC address of the client and a unique serial number identifier of the terminal, or a combination thereof. The unique network identifier of the terminal may include, for example, the IP address of the client, an identifier of the mobile communication network used by the client, or a combination thereof. In some embodiments, the unique application identifier of the terminal may contain, for example, the user agent of the client browser. The local terminal information illustrated above is not intended to be limited to the above identifiers. In other embodiments, the local terminal information may be determined according to application needs, and the embodiments of the disclosure are not restricted to any particular terminal format.

In some embodiments, the environment fingerprint may contain at least one of a unique hardware identifier, a unique network identifier, and a unique application identifier of the terminal in the terminal information. In some embodiments, the environment fingerprint may contain the data generated by encrypting any one or more of a unique hardware identifier, a unique network identifier, and a unique application identifier of the terminal.

In some embodiments, one or more of a unique hardware identifier, unique network identifiers, and unique application identifiers of the terminal may be encrypted through algorithms such as MD5, RSA, or DSA. In some embodiments, the environment fingerprint may be a character string, such as: "f6c534209e0cc087b03696f303549ca0."

The method for generating the environment fingerprint is not limited to the above. In practical applications, the environment fingerprint may be generated according to actual application scenarios, and the embodiments of the disclosure are not restricted to a particular method of generating the environment fingerprint.

In step S220, the client sends the environment fingerprint to the server. In some embodiments, the client can send the environment fingerprint to the server after generating the environment fingerprint at the client.

In step S230, the server stores the environment fingerprint as the preset authentication information. As mentioned above, the environment fingerprint stored at the server may be generated by the client (as illustrated in FIG. 2) or the server (as illustrated in FIG. 1). Therefore, in one embodiment, the preset authentication information may contain at least one of an environment fingerprint generated according to the local terminal information sent by the client or an environment fingerprint generated by the client according to the local terminal information and received by the server.

The above steps S210 through S230 complete a registration protocol negotiation stage between the client and the server. In the illustrated embodiment, the registration protocol negotiation stage between the client and the server may comprise the process of registering on a website through the browser by the user and executing a process on the terminal, or the applications on the terminal, when accessing the server for the first time.

The environment fingerprint negotiated between the server and the client in the registration protocol negotiation stage illustrated in FIG. 2 is generated by the client according to the local terminal information of the client. Moreover, the terminal information is different between terminals. Therefore, other terminals cannot generate an environment fingerprint identical to that in the above registration protocol negotiation stage by using rogue programs or scripts. The server can authenticate the validity of an access request during an interaction for the subsequent services by using the environment fingerprint from the above stage of registration protocol negotiation.

In step S240, the method sends an access request message containing the environment fingerprint from the client to the server.

In step S250, the method receives the access request message at the server and determines whether the access request message contains the environment fingerprint matching the stored preset authentication information. In some embodiments, the server can determine the validity of the current access request message by determining whether the access request message contains an environment fingerprint matching the stored preset authentication information upon receiving the access request message sent by the client.

In step S260, the method, at the server, responds to the access request message according to the results of the determination made in step S250.

In some embodiments, the server can determine the validity of the access request message and execute operations such as adding, deleting, searching, and altering, etc., corresponding to the access request message when it is determined that the access request message contains an environment fingerprint matching the preset authentication information.

In some embodiments, the server can reject the access request message and not execute the above access request operation when the environment fingerprint contained in the access request message does not match the preset authentication. In some embodiments, the server can send a warning message to the client if the access request message does not contain an environment fingerprint matching the preset authentication.

The access request message in step S240 may be sent by an automatically operated rogue program or a script on some terminal page when a CSRF starts. In this case, since the information of different terminals is different, the access request message sent by the automatically operated rogue program or script will not contain the correct environment fingerprint, and then the access request will be rejected by the server.

In one embodiment, the client will generate a unique environment fingerprint according to the local terminal information and send the environment fingerprint to the server. The server will store environment fingerprint as preset authentication information at the stage of registration protocol negotiation between the client and the server. During data interaction between the client and the server, the server can determine the validity of an access request message containing an environment fingerprint by determining whether the received access request message contains the environment fingerprint matching the stored preset authentication information. In this way, another terminal cannot obtain the correct environment fingerprint due to the fact that different terminals possess different terminal information and thus cannot pass server authentication. Therefore, the server can reject an operation requested by the access request message of a different terminal and effectively prevent CSRF. Compared with prior art techniques, the illustrated method can more effectively prevent CSRF attacks, ensure Internet security for users, and meet security and/or privacy requirements.

Figure 3:
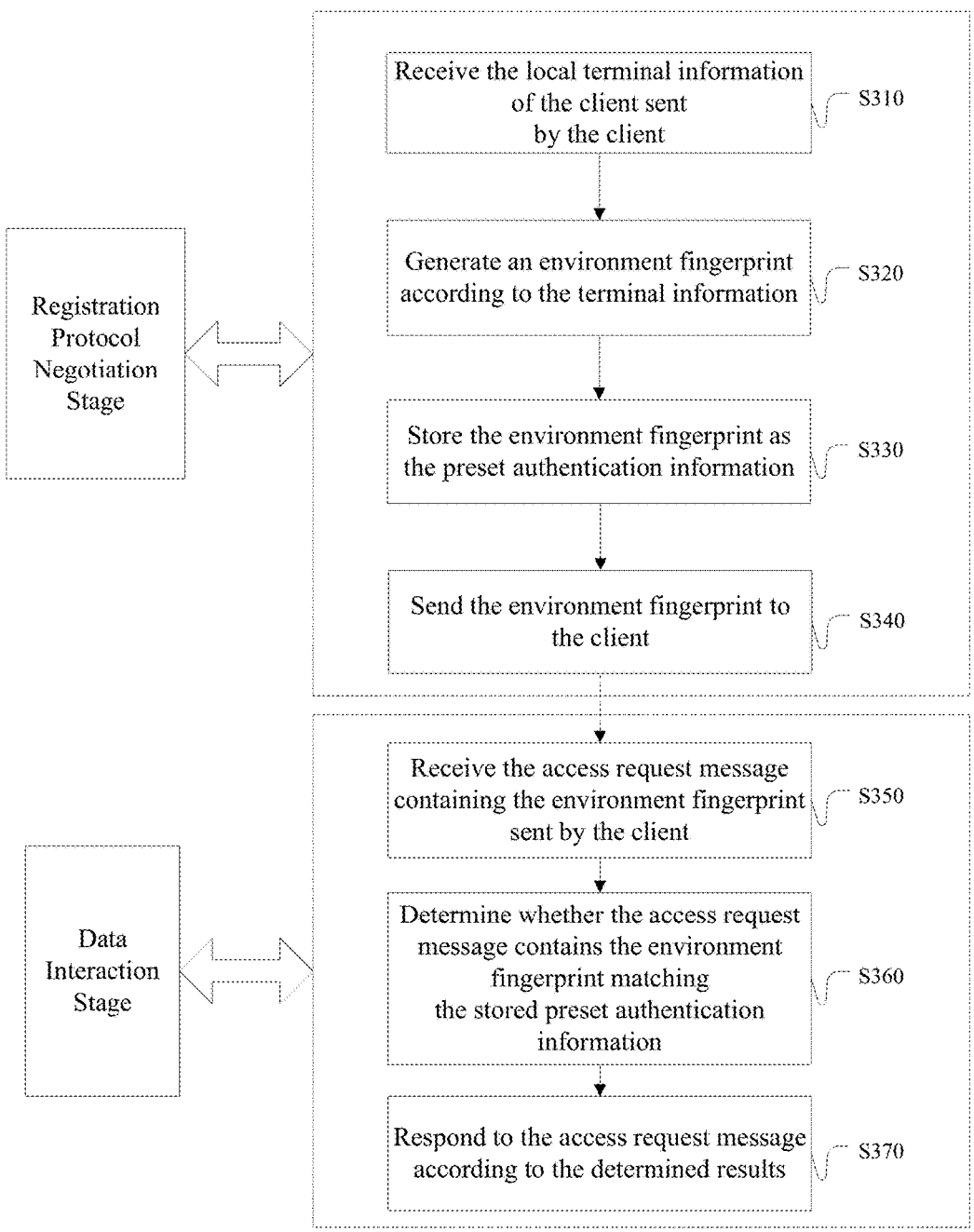
FIG. 3 is a flow diagram of a method for preventing CSRF according to some embodiments of the disclosure.

FIG. 3 is a flow diagram of a method for preventing CSRF, according to some embodiments of the disclosure.

In step S310, the method receives the local terminal information of the client sent by the client. In step S320, the method generates an environment fingerprint according to the terminal information. In step S330, the method stores the environment fingerprint as the preset authentication information. In step S340, the method sends the environment fingerprint to the client.

As illustrated in steps S310 through S340, the method executes a registration protocol negotiation stage with the client. In some embodiments, the above registration protocol negotiation stage between the client and the server may comprise the process of registering on a website through the browser by the user and executing a process on the terminal, or applications on the terminal, when accessing the server for the first time.

The environment fingerprint negotiated between the server and the client in the above stage of registration protocol negotiation is generated according to the terminal information of the client. Moreover, terminal information among terminals is different. Therefore, other terminals cannot generate identical environment fingerprints in the above stage of registration protocol negotiation by using rogue programs or scripts. The server can authenticate the validity of an access request during a data interaction for subsequent services using the environment fingerprint from the above registration protocol negotiation.

In step S350, the method receives an access request message containing an environment fingerprint sent by the client. In step S360, the method determines whether the access request message contains an environment fingerprint matching the stored preset authentication information. In step S370, the method responds to the access request message according to the determined results.

In the embodiment illustrated in FIG. 3, the server will generate a unique environment fingerprint according to the local terminal information of the client, store the environment fingerprint as preset authentication information, and send the environment fingerprint to the client during the registration protocol negotiation stage between the server and the client. During a data interaction stage between the client and the server, the server can determine the validity of an access request message containing an environment fingerprint by determining whether the received access request message contains the environment fingerprint matching the stored preset authentication information sent by the client. In this way, another terminal cannot obtain the correct environment fingerprint due to the fact that different terminals possess different terminal information and thus cannot pass server authentication. Therefore, the server can reject an operation requested by an access request message of a different terminal and thus effectively prevent CSRF. Compared with the prior art, CSRF attacks can be effectively prevented, Internet security for users can be ensured, and security requirements can be met.

Figure 4:
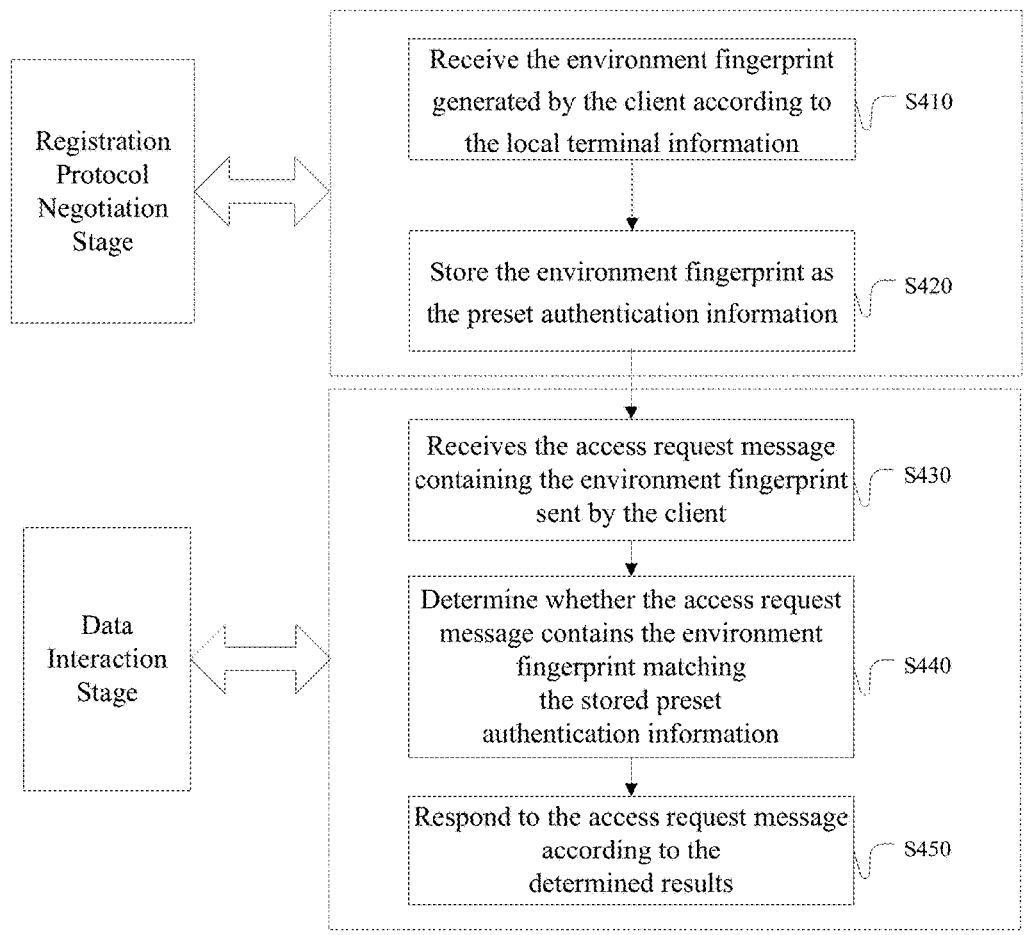
FIG. 4 is a flow diagram of a method for preventing CSRF according to some embodiments of the disclosure.

FIG. 4 is a flow diagram of a method for preventing CSRF, according to some embodiments of the disclosure.

In step S410, the method receives an environment fingerprint generated by the client according to the local terminal information. In step S420, the method stores the environment fingerprint as preset authentication information.

In steps S410 through S420, the server executes a registration protocol negotiation with the client. In the illustrated embodiment, the registration protocol negotiation stage between the client and the server may comprise the process of registering on a web site through the browser by the user and executing a process on the terminal, or applications on the terminal, when accessing the server for the first time.

In step S430, the method receives the access request message containing the environment fingerprint sent by the client. In step S440, the method determines whether the access request message contains the environment fingerprint matching the stored preset authentication information. In step S450, the method responds to the access request message according to the determined results.

In the embodiment illustrated in FIG. 4, the server will receive a unique environment fingerprint generated according to the local terminal information of the client and store the environment fingerprint as preset authentication information during the registration protocol negotiation between the client and the server. During data interactions between the client and the server, the server can determine the validity of an access request message containing an environment fingerprint by determining whether the received access request message contains an environment fingerprint matching the stored preset authentication information sent by the client. In this way, another terminal cannot obtain the correct environment fingerprint due to the fact that different terminals possess different terminal information and thus cannot pass server authentication. Therefore, the server can reject an operation requested by an access request message of a different terminal and thus effectively prevent CSRF. Compared with the prior art, CSRF attacks can be effectively prevented, Internet security for users can be ensured, and security requirements can be met.

Figure 5:
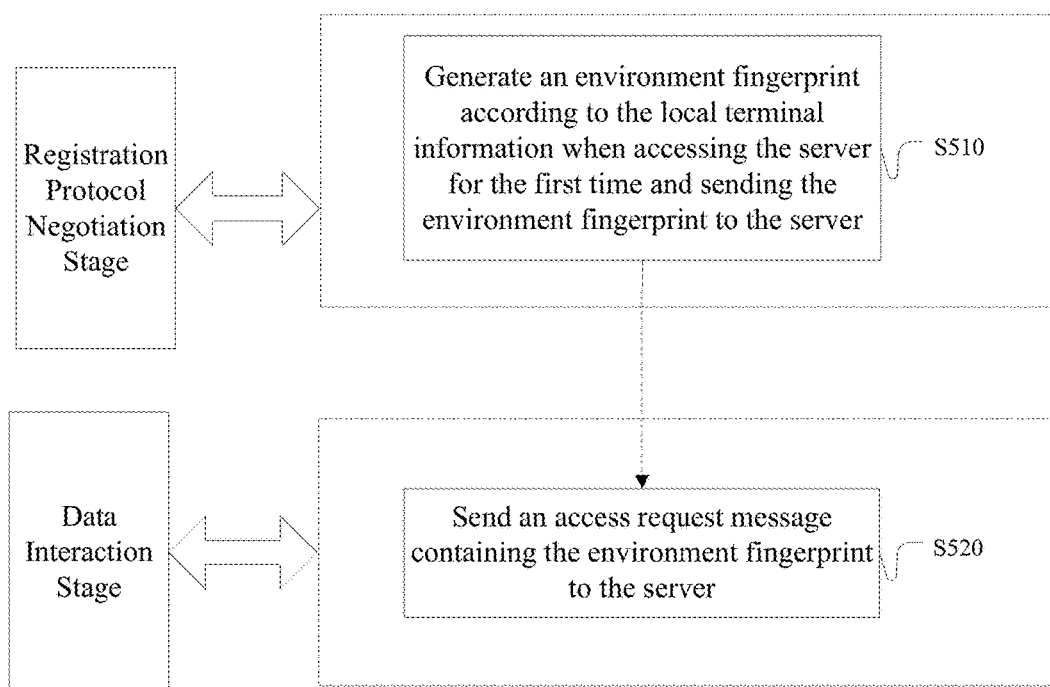
FIG. 5 is a flow diagram of a method for preventing CSRF according to some embodiments of the disclosure.

FIG. 5 is a flow diagram of a method for preventing CSRF, according to some embodiments of the disclosure.

In step S510, the method generates an environment fingerprint according to local terminal information, when accessing a server for the first time, and sends the environment fingerprint to the server.

In one embodiment, the client executes a registration protocol negotiation with the server. In one embodiment, the above registration protocol negotiation between the client and the server may comprise the process of registering on some website through the browser by the user and executing a process on the terminal or applications on the terminal when accessing the server for the first time.

The environment fingerprint negotiated between the server and the client in the above stage of registration protocol negotiation is generated by the client according to the terminal information of the client. Moreover, the terminal information among different terminals is different. Therefore, other terminals cannot generate an environment fingerprint identical to that in the above stage of registration protocol negotiation by using rogue programs or scripts.

In some embodiments, when a data interaction is required between the client and the server, the method further comprises the following steps.

In step S520, the method sends an access request message containing the environment fingerprint to the server.

In some embodiments, the access request message sent to the server by the client during a data interaction for subsequent services contains the environment fingerprint. Thus, the server can authenticate the validity for the access request based on the environment fingerprint.

In one embodiment, the client generates a unique environment fingerprint based on local terminal information and sends the environment fingerprint to the server. The server then stores the environment fingerprint as preset authentication information during the registration protocol negotiation between the client and the server. During a data interaction between the client and the server, the access request message of the client may include the environment fingerprint, so that the server can determine the validity of the access request message by determining whether the received access request message contains an environment fingerprint matching the stored preset authentication information. In this way, another terminal cannot obtain the correct environment fingerprint due to different terminal information of different terminals, and thus cannot pass server authentication. Therefore, the server can reject an operation requested by an access request message of a different terminal and thus effectively prevent CSRF. Compared with the prior art, CSRF attacks can be effectively prevented, Internet security for users can be ensured, and security requirements can be met.

Figure 6:
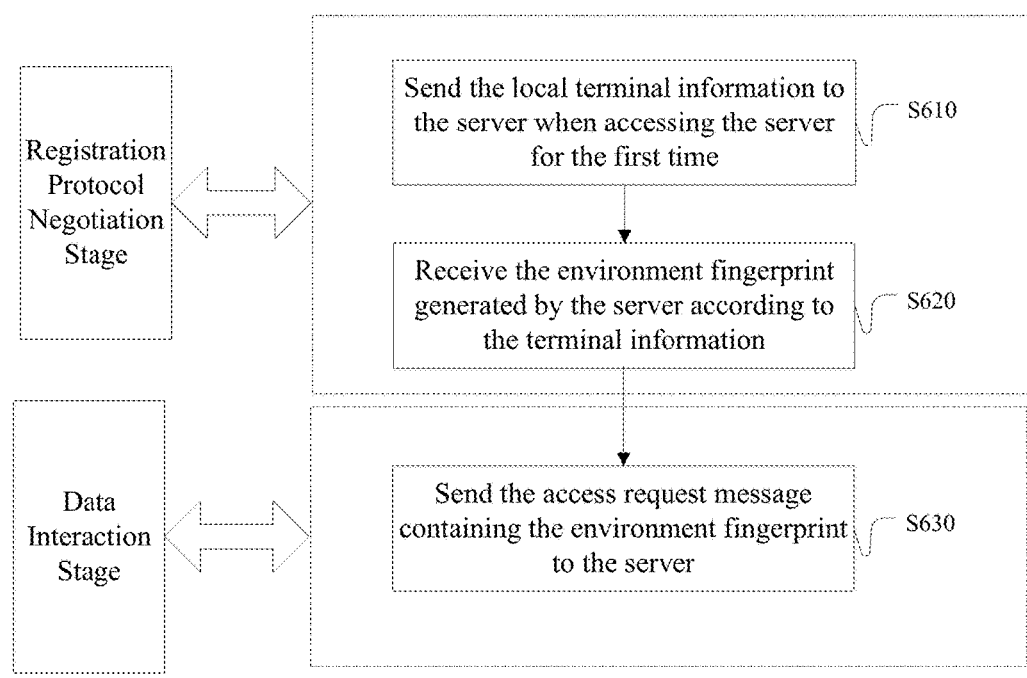
FIG. 6 is a flow diagram of a method for preventing CSRF according to some embodiments of the disclosure.

FIG. 6 is a flow diagram of a method for preventing CSRF, according to some embodiments of the disclosure.

In step S610, the method sends local terminal information to the server from the client when accessing the server for the first time. In step S620, the method receives the environment fingerprint generated by the server according to the terminal information.

In steps S610 through S620, the client executes a registration protocol negotiation stage with the server. In one embodiment, the above registration protocol negotiation stage between the client and the server may comprise the process of registering on some website through the browser by the user and executing a process on the terminal, or applications on the terminal, when accessing the server for the first time.

The environment fingerprint negotiated between the server and the client in the above registration protocol negotiation stage is generated according to the terminal information of the client. Moreover, the data of other terminals is different from that of the corresponding client terminal. Therefore, other terminals cannot generate identical environment fingerprints in the above stage of registration protocol negotiation by using rogue programs or scripts.

In some embodiments, when a data interaction is required between the client and the server, the method further comprises the following steps.

In step S630, the method sends the access request message containing the environment fingerprint to the server.

In some embodiments, the access request message sent to the server by the client during the data interaction for the subsequent services may contain an environment fingerprint, thus, the server can authenticate the validity for the above access request.

In one embodiment, the client may receive a unique environment fingerprint generated by the server according to the local terminal information of the client generated during the registration protocol negotiation between the client and the server. During data interactions between the client and the server, the access request message of the client contains the environment fingerprint, so that the server can determine the validity of the access request message by determining whether the received access request message contains the environment fingerprint matching the stored preset authentication information. In this way, another terminal cannot obtain the correct environment fingerprint due to the fact that different terminals possess different terminal information, and thus cannot pass server authentication. Therefore, the server can reject an operation requested by an access request message of a different terminal and thus effectively prevent CSRF attacks. Compared with the prior art, CSRF attacks can be effectively prevented, Internet security for users can be ensured, and security requirements can be met.

Figure 7:
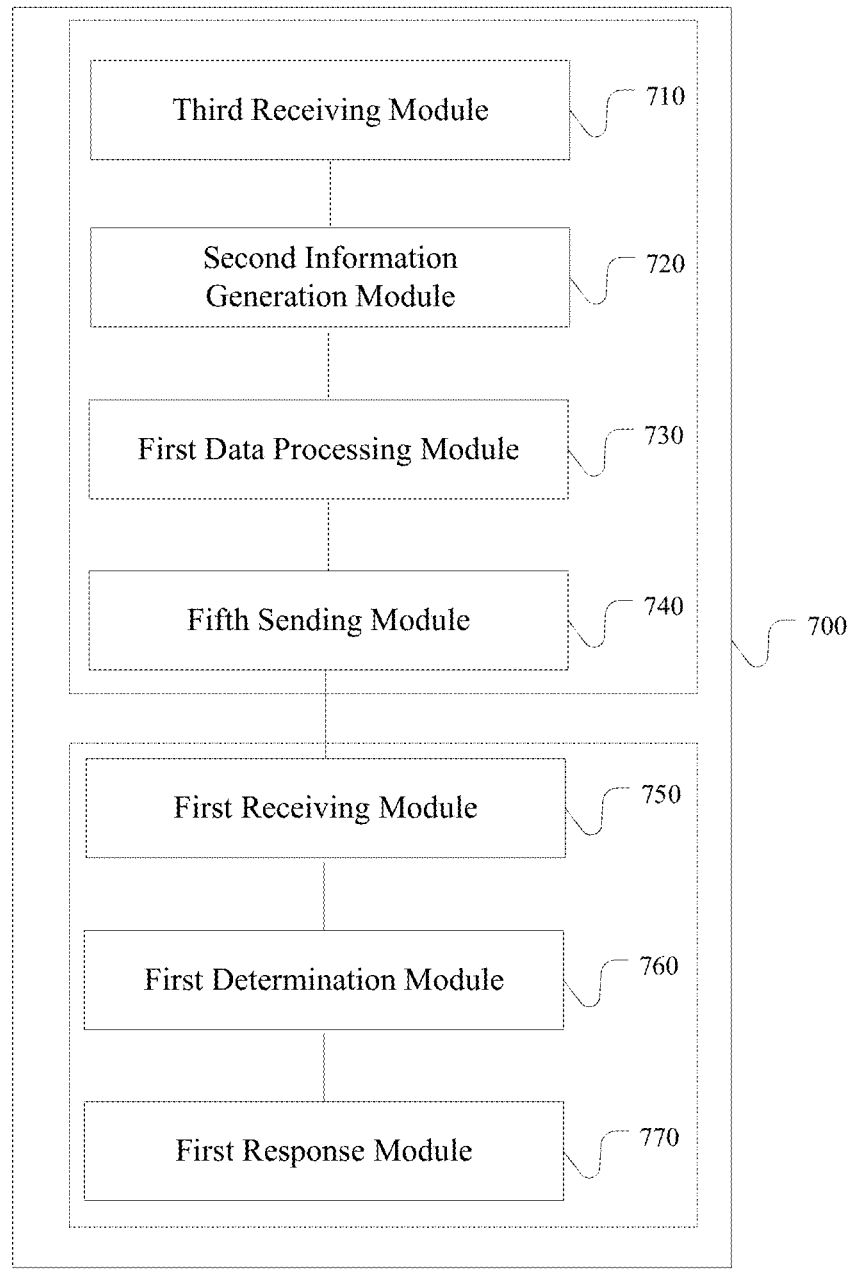
FIG. 7 is a diagram of a server for preventing CSRF, according to some embodiments of the disclosure.

FIG. 7 is a diagram of a server for preventing CSRF, according to some embodiments of the disclosure. Referring to FIG. 7, the server 700 includes the following elements.

A third receiving module 710 is configured for receiving the local terminal information of the client sent by the client. A second information generation module 720 is configured for generating the environment fingerprint according to the terminal information. A first data processing module 730 is configured for storing the environment fingerprint as the preset authentication information. A fifth sending module 740 is configured for sending the environment fingerprint to the client.

The third receiving module 710, the second information generation module 720, the first data processing module 730, and the fifth sending module 740 execute the registration protocol negotiation stage between the server and the client. The environment fingerprint negotiated between the server and the client during the registration protocol negotiation is generated by the second information generation module 720 according to the terminal information of the client. Moreover, the terminal information among different terminals is different. Therefore, other terminals cannot generate an environment fingerprint identical to that in the above registration protocol negotiation by using rogue programs or scripts.

In some embodiments, for data interaction between the client and the server, the server 700 further includes the following.

A first receiving module 750 is configured for receiving the access request message containing the environment fingerprint sent by the client. A first determination module 760 is configured for determining whether the access request message contains the environment fingerprint matching the stored preset authentication information. A first response module 770 is configured for responding to the access request message according to the determined results.

In one embodiment of the disclosure of the device for preventing CSRF, the preset authentication information may contain at least one of the environment fingerprint generated according to the local terminal information sent by the client, and the received environment fingerprint generated by the client according to the local terminal information.

According to the environment fingerprint from the above registration protocol negotiation, the first determination module 760 can authenticate the validity of an access request during a data interaction for subsequent services by determining whether the access request message contains the environment fingerprint matching the stored preset authentication information.

In some embodiments, the local terminal information may contain at least one of the following: a unique hardware identifier, a unique network identifier, and a unique application identifier of the terminal.

In some embodiments, the first response module 770 may further include a first operation unit for rejecting the access request message when the first determination module determines that the environment fingerprint matching the preset authentication is not contained in the access request message.

In some embodiments, the first response module 770 may further include a second operation unit for executing the operation corresponding to the access request message when the first determination module determines that the environment fingerprint matching the stored preset authentication information is contained in the access request message.

Figure 8:
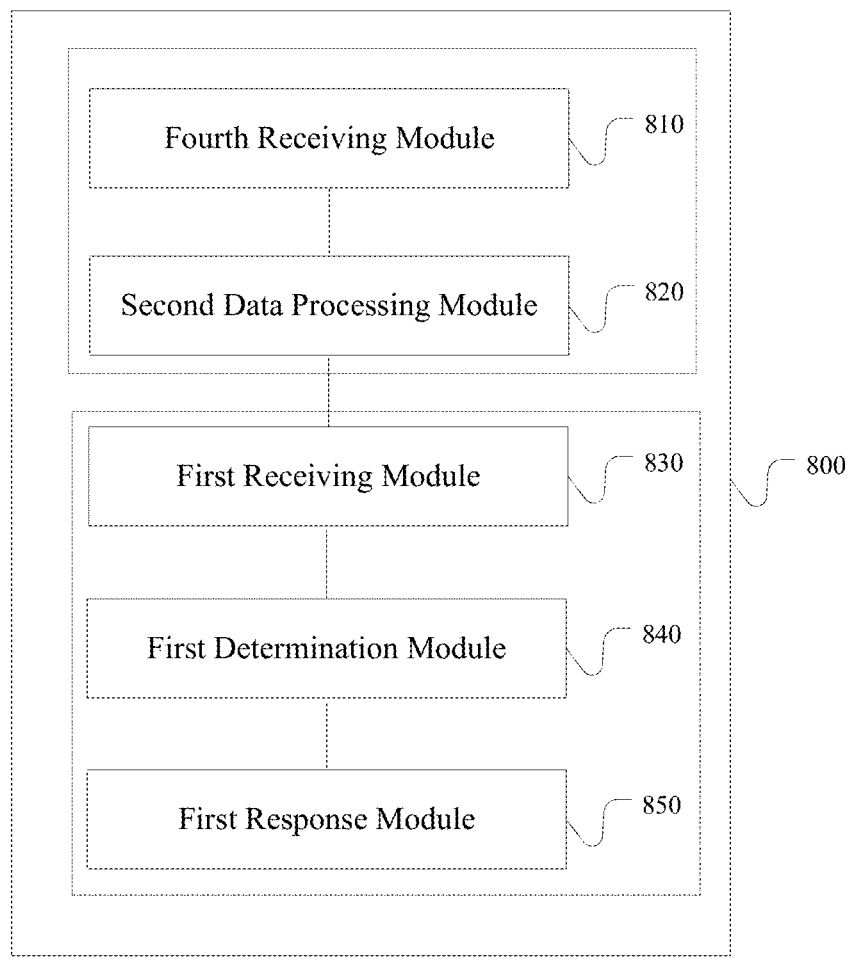
FIG. 8 is a diagram of a server for preventing CSRF, according to some embodiments of the disclosure.

FIG. 8 is a diagram of a server for preventing CSRF, according to some embodiments of the disclosure. Referring to FIG. 8, the device 800 includes the following elements.

A fourth receiving module 810 is configured for receiving an environment fingerprint generated by a client according to local terminal information. A second data processing module 820 is configured for storing the environment fingerprint as preset authentication information. The fourth receiving module 810 and the second data processing module 820 execute the registration protocol negotiation between the server and the client.

In some embodiments, for a data interaction between the client and the server, the device 800 further comprises the following.

A first receiving module 830 is configured for receiving the access request message containing the environment fingerprint sent by the client. A first determination module 840 is configured for determining whether the access request message contains the environment fingerprint matching the stored preset authentication information.

Using the environment fingerprint in the above registration protocol negotiation, the first determination module 840 can authenticate the validity of an access request during a data interaction for subsequent services by determining whether the access request message contains the environment fingerprint matching the stored preset authentication information.

A first response module 850 is configured for responding to the access request message according to the determined results. In some embodiments, the local terminal information may contain at least one of the following: a unique hardware identifier, a unique network identifier and a unique application identifier of the terminal. In some embodiments, the first response module 850 further comprises a first operation unit for rejecting the access request message when the first determination module determines that the environment fingerprint matching the preset authentication is not contained in the access request message.

In some embodiments, the first response module 850 further comprises a second operation unit for executing the operation corresponding to the access request message when the first determination module determines that the environment fingerprint matching the stored preset authentication information is contained in the access request message.

Figure 9:
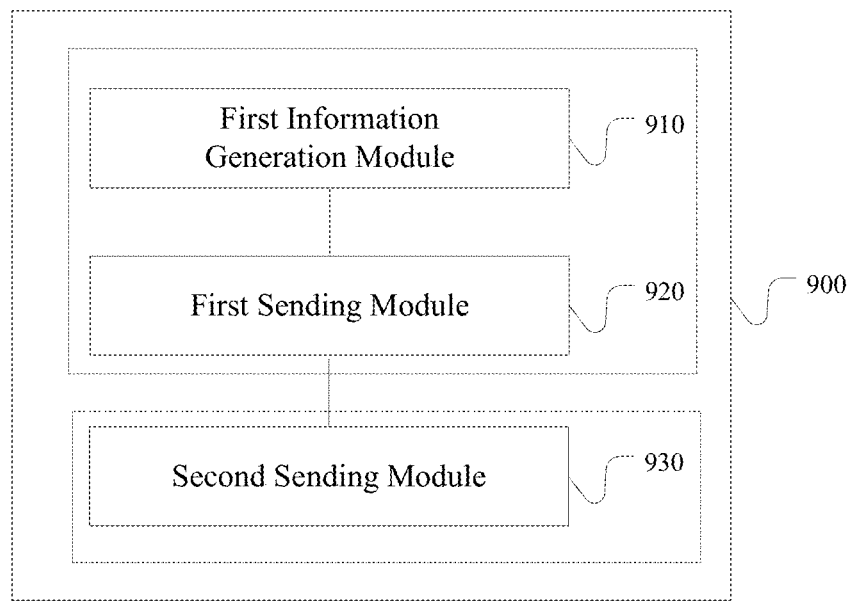
FIG. 9 is a diagram of a client device for preventing CSRF, according to some embodiments of the disclosure.

FIG. 9 is a diagram of a client device for preventing CSRF, according to some embodiments of the disclosure. Referring to FIG. 9, the client 900 may include the following elements.

A first information generation module 920 is configured for generating an environment fingerprint according to the local terminal information when accessing the server for the first time. A first sending module 920 is configured for sending the environment fingerprint to the server when accessing the server for the first time. The first information generation module 910 and the first sending module 920 execute the registration protocol negotiation between the server and the client. The environment fingerprint negotiated between the server and the client in the above registration protocol negotiation is generated by the first information generation module 910 according to the terminal information of the client. Moreover, the terminal information among different terminals is different. Therefore, other terminals cannot generate an environment fingerprint identical to that in the above registration protocol negotiation by using rogue programs or scripts.

In some embodiments, for data interaction between the client and the server, the client 900 further comprises a second sending module 930 for sending the access request message containing the environment fingerprint to the server.

The second sending module 930 can send an access request message containing the environment fingerprint to the server during the data interaction for the subsequent services, thus, the server can authenticate the validity for the above access request.

In some embodiments, the local terminal information contains at least one of the following: a unique hardware identifier, a unique network identifier, and a unique application identifier of the terminal.

Figure 10:
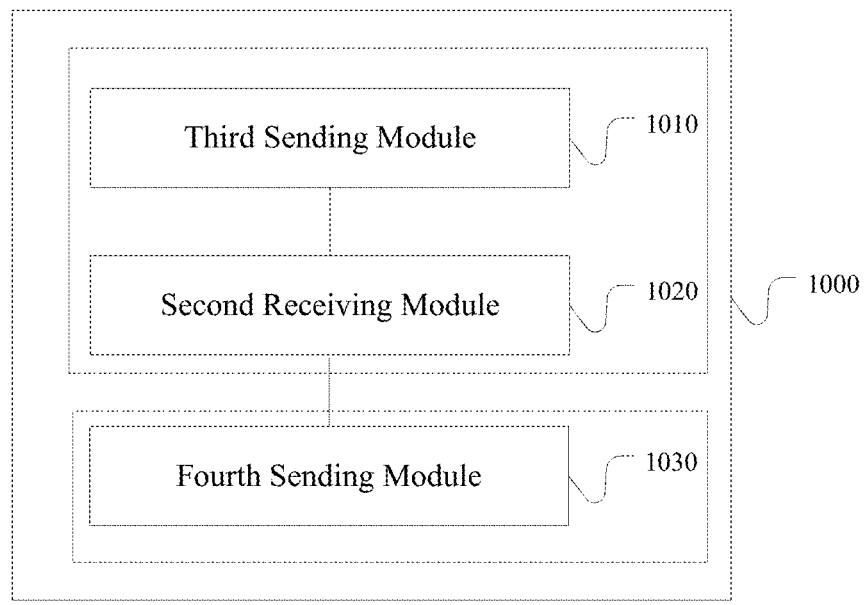
FIG. 10 is a diagram of a client device for preventing CSRF, according to some embodiments of the disclosure.

FIG. 10 is a diagram of a client device for preventing CSRF, according to some embodiments of the disclosure. Referring to FIG. 10, the device 1000 includes the following elements.

A third sending module 1010 is configured for sending the local terminal information to the server when accessing the server for the first time. A second sending module 1020 is configured for receiving the environment fingerprint generated by the server according to the terminal information. The third sending module 1010 and the second receiving module 1020 execute the registration protocol negotiation with the server and the client.

In some embodiments, for data interaction between the client and the server, the client further includes a fourth sending module 1030 for sending the access request message containing the environment fingerprint to the server.

The fourth sending module 1030 can send an access request message containing the environment fingerprint to the server during a data interaction for the subsequent services. Thus, the server can authenticate the validity for the access request.

In some embodiments, the local terminal information contains at least one of the following: a unique hardware identifier, a unique network identifier, and a unique application identifier of the terminal.

Figure 11:
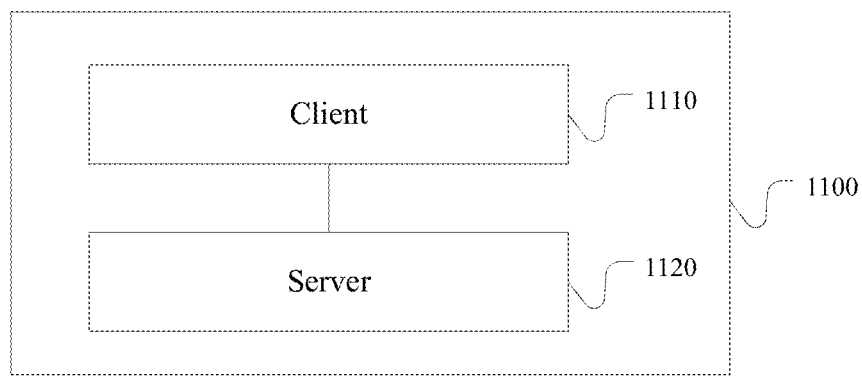
FIG. 11 is a diagram of a system for preventing CSRF according to some embodiments of the disclosure.

FIG. 11 is a diagram of a system for preventing CSRF according to some embodiments of the disclosure. Referring to FIG. 11, the system 1100 includes a client 1110 and a server 1120.

The client 1110 is configured for sending the local terminal information to the server when accessing the server for the first time, receiving the environment fingerprint generated by the server according to the terminal information, and sending the access request message containing the environment fingerprint to the server.

The server 1120 is configured for generating an environment fingerprint according to the terminal information, storing the environment fingerprint as the preset authentication information; sending the environment fingerprint to the client, and receiving the access request message containing the environment fingerprint sent by the client. The server 1120 is also configured for determining whether the access request message contains the environment fingerprint matching the stored preset authentication information, and responding to the access request message according to the determined results.

In an alternative embodiment, the client 1110 may be configured to generate an environment fingerprint according to the local terminal information when accessing the server for the first time, send the environment fingerprint to the server, and send the access request message containing the environment fingerprint to the server.

Alternatively, or in conjunction with the foregoing embodiment, the server 1220 may be configured to receive the environment fingerprint generated by the client according to the local terminal information, store the environment fingerprint as the preset authentication information, and receive the access request message containing the environment fingerprint sent by the client. The server 1220 may also be configured to determine whether the access request message contains the environment fingerprint matching the stored preset authentication information, and respond to the access request message according to the determined results.

The technical solutions of the methods, the devices, and the systems for preventing CSRF provided by the embodiments of the disclosure will generate a unique environment fingerprint according to the local terminal information of the client, and store the environment fingerprint as preset authentication information during a stage of registration protocol negotiation between a client and a server. During a data interaction between the client and the server, the access request message of the client contains the environment fingerprint, so that the server can determine the validity of the access request message by determining whether the received access request message contains the environment fingerprint matching the stored preset authentication information. In this way, another terminal cannot obtain the correct environment fingerprint due to the fact that different terminals possess different terminal information, and thus cannot pass server authentication. Therefore, the server can reject an operation requested by an access request message of a different terminal and thus effectively prevent CSRF. Compared with the prior art, CSRF attacks can be effectively prevented, Internet security for users can be ensured, and security requirements can be met.

Although the data interactions between the client and the server, such as data collection, interaction, and processing, are described in the disclosure, the disclosure is not limited to the conditions of a complete standard or the application of data processing discussed herein. The above descriptions involved in the embodiments are only applications according to some embodiments of the disclosure. The above technical solutions of the disclosure can also be executed in some other framework supporting custom page elements. It is obvious that, without repetitive descriptions, other non-creative variants conforming to the processing methods and steps of the above embodiments can also be realized by the teachings of this disclosure.

Although the disclosure provides the operation steps of the methods as described in the embodiments or the process diagrams, based on conventional or non-creative works, more operation steps or less operation steps can be included. The step sequence listed in the embodiments is only one of the multiple sequences, and does not represent the sole execution sequence. While the steps are executed in an actual device or a client product, they may be executed in the sequences as shown in the embodiments or the drawings or executed in parallel (for example, using parallel processors or in a multi-threaded environment).

The device or module illustrated in the above embodiments can be realized by computer chips or other general electronic components, or products with specific functions. For better description, the above device is described with various modules divided by functions. Of course, for implementing the disclosure, the functions of the modules can be realized in one or more software and/or hardware elements, or the modules for realizing the same function can be realized through the combination of multiple sub-modules or sub-units.

Those skilled in the art shall also understand that, in addition to realizing the controller through the method of the pure computer readable program codes, the same functions of the controller can also be realized in the form of logic gates, switches, application-specific integrated circuits, programmable logic controllers, embedded microcontrollers, or the like, through logic programming of the method's steps. Thus, the controller can be regarded as a hardware component; the devices contained therein for realizing various functions also can be regarded as structure in the hardware component. The devices for realizing various functions can even be regarded as both the software for realizing the method and the structure in the hardware component.

The disclosure can be described in the general context of computer executable commands to be executed by the computer, for example, as one or more program modules. Generally, the program modules comprises the routines, the programs, the objects, the components, the data structures and categories, etc., for executing particular tasks or abstract data types. The disclosure can also be implemented in a distributed computing environment. In these distributed computing environments, the tasks will be executed by the remote processing device connected through the communication network. In the distributed computing environment, the program module may be located in the local and remote computer storage media, including storage devices.

Thus, those skilled in the art can understand that the disclosure may be realized with the help of software and necessary general hardware platforms. Based on this understanding, the essential parts or the part of the technical solutions of the disclosure making a contribution over the prior art can be embodied in the form of a software product which can be stored in a storage media such as ROM/RAM, diskettes, or optical discs, and the like, comprising numerous commands for facilitating one or more computer devices (for example, a personal computer, a mobile terminal, a server, or a network device) to execute the embodiments of the disclosure or execute the method described by some embodiments.

The embodiments in the disclosure are described progressively. For similar or identical parts in the embodiments, the descriptions can be mutually referred to. The features described for each embodiment in detail are those parts that are different from the other embodiments. The disclosure can be adopted in many general or special computer system environments or configurations. It may comprise a personal computer, a server computer, a handheld or portable device, a tablet device, a mobile communication terminal, a multi-processor system, a microprocessor-based system, a programmable electronic device, a network PC, a small-size computer, a large-size computer, the distributed computing environment of any of the above systems or devices, and so forth.

Although the disclosure is described through the embodiments, those skilled in the art shall understand that the disclosure may have many variants and alterations within the principle of the disclosure and the attached claims are intended to encompass these variants and alterations without departing from the spirit of the disclosure.

What is claimed is:

1. A method for preventing cross-site request forgery, the method comprising:
    receiving, by a server, local terminal information from a client device, the local terminal information received as part of a request by the client device for a web page hosted by the server;
    generating, by the server, a first environment fingerprint of the client device based on the local terminal information, the first environment fingerprint comprising encrypted local terminal information associated with the client device;
    receiving, at the server, an access request message, the access request message including an identity of at least one operation to be performed by the server and a second environment fingerprint, the second environment fingerprint generated by the client device;
    comparing, by the server, whether the second environment fingerprint matches the first environment fingerprint;
    rejecting, by the server, the access request message if the comparison indicates that the second environment fingerprint does not match the first environment fingerprint; and
    executing, by the server, the operation included with the access request message if the comparison indicates that the second environment fingerprint matches the first environment fingerprint.

2. The method of claim 1, wherein the local terminal information includes at least one of a unique hardware identifier, a unique network identifier, and a unique application identifier.

3. The method of claim 1, wherein the local terminal information includes at least one of a unique hardware identifier, a unique network identifier, and a unique application identifier, and wherein generating the first environment fingerprint further comprises encrypting, by the server, the local terminal information.

4. The method of claim 1 further comprising sending, by the server, the first environment fingerprint to the client device prior to receiving the access request message from the client device.

5. The method of claim 1, wherein before storing a first environment fingerprint associated with a client device the method further comprises receiving, at the server, the first environment fingerprint from the client device.

6. The method of claim 1, wherein storing a first environment fingerprint comprises storing the first environment fingerprint when the client device initially accesses the server.

7. An apparatus for preventing cross-site request forgery, the apparatus comprising:
    a processor; and
    a non-transitory memory storing computer-executable instructions therein that, when executed by the processor, cause the apparatus to:
        host a web page;
        receive local terminal information from a client device, the local terminal information received as part of a request by the client device for the web page;
        generating, by the server, a first environment fingerprint of the client device based on the local terminal information, the first environment fingerprint comprising encrypted local terminal information associated with the client device;
        receiving, at the server, an access request message, the access request message including an identity of at least one operation to be performed by the server and a second environment fingerprint, the second environment fingerprint generated by the client device;
        compare whether the second environment fingerprint matches the first environment fingerprint;
        reject the access request message if the comparison indicates that the second environment fingerprint does not match the first environment fingerprint; and
        execute the operation included with the access request message if the comparison indicates that the second environment fingerprint matches the first environment fingerprint.

8. The apparatus of claim 7 wherein the local terminal information includes at least one of a unique hardware identifier, a unique network identifier, and a unique application identifier.

9. The apparatus of claim 7, wherein the local terminal information includes at least one of a unique hardware identifier, a unique network identifier, and a unique application identifier, and wherein the instructions causing the apparatus to generate the first environment fingerprint further comprise instructions causing the apparatus to encrypt the local terminal information.

10. The apparatus of claim 7 wherein the computer-executable instructions further cause the apparatus to send the first environment fingerprint to the client device prior to receiving an access request message from the client device.

11. The apparatus of claim 7, wherein before executing the instructions to store a first environment fingerprint associated with a client device, the computer-executable instructions further cause the apparatus to receive, at the server, the first environment fingerprint from the client device.

12. The apparatus of claim 7, wherein storing an environment fingerprint comprises storing the first environment fingerprint when a client device initially accesses the server.

13. A non-transitory computer readable storage medium tangibly storing computer program instructions that are executed by a computer processor, the computer program instructions defining the steps of:

hosting, by a processor, a web page;

receiving, by the processor, local terminal information from a client device, the local terminal information received as part of a request by the client device for the web page;

generating, by the processor, a first environment fingerprint of the client device based on the local terminal information, the first environment fingerprint comprising encrypted local terminal information associated with the client device;

receiving, by the processor, an access request message, the access request message including an identity of at least one operation to be performed by the server and a second environment fingerprint, the second environment fingerprint generated by the client device;

comparing, by the processor, whether the second environment fingerprint matches the first environment fingerprint;

rejecting, by the processor, the access request message if the comparison indicates that the second environment fingerprint does not match the first environment fingerprint; and executing, by the processor, the operation included with the access request message if the comparison indicates that the second environment fingerprint matches the first environment fingerprint.

14. The medium of claim 13 wherein the local terminal information includes at least one of a unique hardware identifier, a unique network identifier, and a unique application identifier.

15. The medium of claim 13, wherein the local terminal information includes at least one of a unique hardware identifier, a unique network identifier, and a unique application identifier, and wherein generating the first environment fingerprint further comprises encrypting, by the processor, the local terminal information.

16. The medium of claim 13, the medium further comprises computer program instructions defining steps to be executed before executing the instructions to store a first environment fingerprint associated with a client device, the further steps including the step of receiving, by the processor, the first environment fingerprint from the client device.

17. The medium of claim 13, wherein the instructions defining the steps of storing a first environment fingerprint associated with a client device further comprises instructions to store the first environment fingerprint when a client device initially accesses the server.

\* \* \* \* \*